Aug. 11, 1925.
W. HARRIS
LET-OFF MEANS FOR LOOMS
Filed March 2, 1925
1,548,993
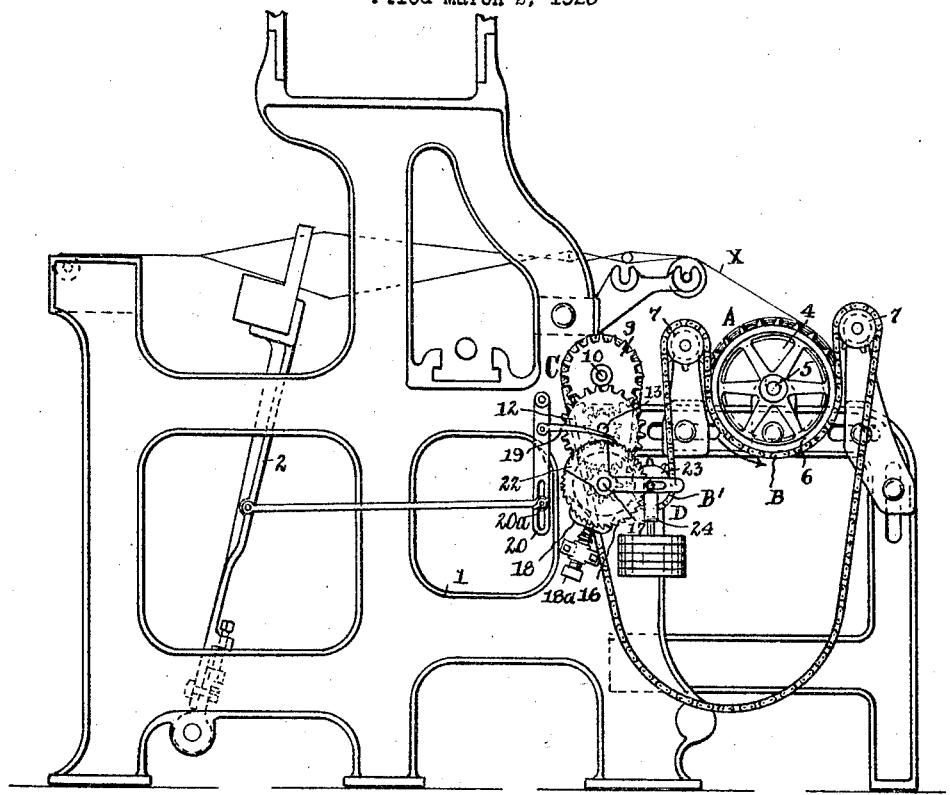
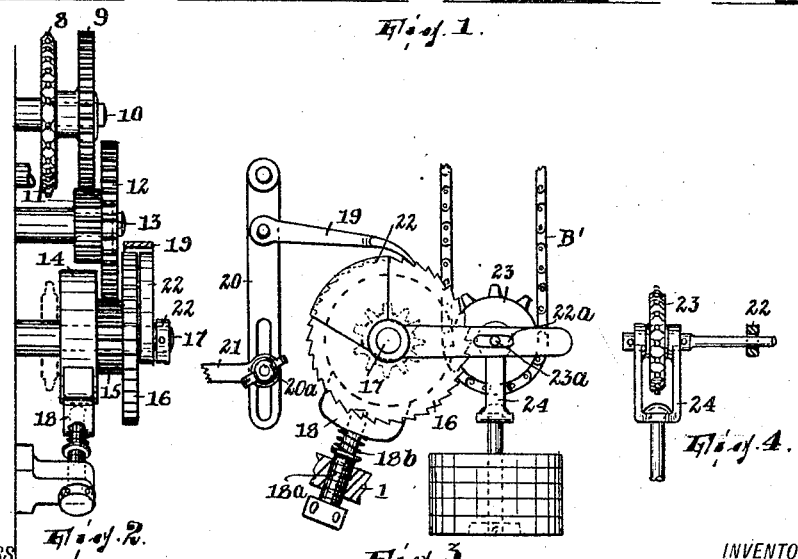
WITNESS
Wm L Bell
INVENTOR,
William Harris,
ATTORNEY Patented Aug. 11, 1925.

1,548,993

UNITED STATES PATENT OFFICE.

WILLIAM HARRIS, OF PATERSON, NEW JERSEY.

LET-OFF MEANS FOR LOOMS.

Application filed March 2, 1925. Serial No. 12,542.

*To all whom it may concern:*

Be it known that I, WILLIAM HARRIS, a citizen of the United States, residing at Paterson, in the county of Passaic and State of New Jersey, have invented certain new and useful Improvements in Let-Off Means for Looms, of which the following is a specification.

This invention relates to let-off mechanism for looms and it has for its object to provide a let-off means which will preserve an entirely uniform tension on the warp under the varying conditions incident to weaving.

According to my invention in its broadest aspect a flexible attenuated device is in tractive engagement with a part of the rotary means to supply the warp and has a portion thereof extending from said part relatively reversely to the direction in which the warp extends from the element of said means on which it is wound, and there is means to pay out said portion in the direction in which it is pulled by said part (as the warp itself is pulled forward in the loom) and in a bight in said portion between said part and means there is also means, tensioning the bight, for controlling the paying out of said portion. In the specific embodiment herein set forth the means to pay out said portion is a means to advance the same intermittently in the direction in which it is pulled by said part and in the intervals between such advances hold said portion against advance.

In the drawing,

Fig. 1 is a side elevation of a loom embodying the improved let-off mechanism;

Fig. 2 is a front elevation of the essential parts of said mechanism;

Fig. 3 is a side elevation of certain parts thereof; and

Fig. 4 shows a detail.

1 is the loom frame and 2 a going part, as the backward and forward moving batten-including structure.

The rotary means to supply the warp X is generally indicated by A; the flexible attenuated device by B; the paying-out means by C; and the means, tensioning a bight in the device B and controlling the means C, by D. Describing these now in detail:

The means A includes in the present case the beam 4, having its shaft or trunnion 5 journaled in the loom frame in the usual way, and a sprocket wheel 6 fixed to rotate with the beam.

The flexible attenuated device B is in the present case a chain extending in peripheral contact with the underhalf of the sprocket wheel (being engaged with its teeth) as by being slung over idler sprocket wheels 7 journaled in the frame; in the present case this chain is endless.

The paying-out means C in the present case comprises the following parts: A combined sprocket wheel 8 and gear 9 fixed to rotate together on a stud 10, the chain extending over and being engaged with the teeth of the sprocket wheel; a combined pinion 11 and a gear 12 fixed to rotate together on a stud 13, the pinion 11 being in mesh with the gear 9; a combined brake wheel 14, pinion 15 and ratchet wheel 16 fixed to rotate on a stud 17, the pinion being in mesh with the gear 12; a spring pressed brake shoe 18 bearing against the periphery of the brake wheel 14; and a pawl 19 to engage the teeth of the ratchet wheel and pivotally connected with a lever 20 to move back and forth when the lever is itself oscillated through a link 21 from the structure 2. Desirable adjustments are afforded by a slot and set-screw connection $20^a$ between parts 20 and 21 and by arranging the brake shoe 18 on a screw spindle $18^a$ tapped into a part of the loom frame (or a bracket thereof) and a spring $18^b$ interposed between a shoulder on the spindle and the brake shoe, into which the end of the spindle freely enters.

The means D includes a segmental sheath 22 whose periphery is coincident with the tops of the teeth of the ratchet wheel, said sheath being a lever fulcrumed on the stud 17; a sprocket wheel 23 engaged in a bight B' of the chain depending between sprocket wheel 8 and the near idler sprocket 7; and a weight carrier 24 hung from the central spindle $23^a$ of the sprocket wheel 23, said spindle being engaged in a slot $22^a$ in the free arm of the sheath or lever 22.

It will be understood that the sheath 22 is movable from the position actually shown, on 17 as a pivot, to a position where it will hold the pawl disengaged with the ratchet wheel.

In the illustrated position of the parts, when the loom is running and the warp is being pulled forward, the device (or chain)

B is pulled by means A in the direction of the arrow (Fig. 1) and at the same time it is being paid out by means C. This paying-out, by proper designing and timing of the parts, is made faster than the take-up of said device by the means A, and in time the bight B' will have increased to such an extent as the result of gravity acting on the weight-carrier 24 that the sheath 22 of means D will be shifted clock-wise and so disengage the pawl from the ratchet, so that for a time the pawl will oscillate idly and the ratchet-including train will remain without intermittent advance. During this time the bight B' is of course taken up, and this proceeds until the sheath has been in consequence shifted anti-clockwise sufficiently to again clear the pawl and allow the latter to actuate the ratchet-including train and again advance the chain. It will be understood that on account of brake-shoe 18 the ratchet-including train is held against rotation under the influence of the weight-carrier except when said train is positively moved by the pawl. Thus, broadly, C is a means to pay out the chain in the direction in which it is pulled by means A and D is means to control the paying-out; or, specifically, C is a means to advance the chain intermittently in said direction and in the intervals beween such advances hold the chain against advance, and D is a means to control means C as thus functioning.

The result of my improvement in actual practice is that the warp is subject to tension which is constantly uniform in character, the weight affording a constant resistance to advance of the warp-supply means although the paying-out of the chain by means C is actually (when occurring) intermittent.

Having thus fully described my invention what I claim and desire to secure by Letters Patent is:

1. In combination, rotary means to supply the warp including a rotary element on which the warp is wound, a flexible attenuated device in tractive engagement with and having a portion thereof extending from a rotary part of said means relatively reversely to the direction in which the warp extends from said element, means to force forward said portion in the direction in which it is pulled by said part, said portion having a bight between said part and the last-named means, and means, tensioning the bight, for controlling the paying-out of said portion.

2. In combination, rotary means to supply the warp including a rotary element on which the warp is wound, a flexible attenuated device in tractive engagement with and having a portion thereof extending from a rotary part of said means relatively reversely to the direction in which the warp extends from said element, means to force forward said portion intermittently in the direction in which it is pulled by said part and at the intervals between such advances hold said portion against advance, said portion having a bight between said part and the last-named means, and means, tensioning the bight, for controlling the last-named means.

3. In combination, rotary means to supply the warp including a rotary element on which the warp is wound, a flexible attenuated device in tractive engagement with and having a portion thereof extending from a rotary part of said means relatively reversely to the direction in which the warp extends from said element, rotary means, including a ratchet, with which said portion is also in tractive engagement, going means, including a pawl movable into and out of engagement with the ratchet, for rotating the second rotary means, said portion having a bight between said part and the second-named means, and means, tensioning the bight, for controlling the movements of the pawl into and out of engagement with the ratchet.

In testimony whereof I affix my signature.

WILLIAM HARRIS.